United States Patent [19]

Geller et al.

[11] 4,342,355

[45] Aug. 3, 1982

[54] CARWASH DOOR

[76] Inventors: Martin Geller, 9 Hickory Way, Sharon, Mass. 02067; Russell Doyle, 24 Elm St., Duxbury, Mass. 02332

[21] Appl. No.: 135,447

[22] Filed: Mar. 31, 1980

[51] Int. Cl.³ .............................................. A47H 5/00
[52] U.S. Cl. ..................................... 160/331; 160/332
[58] Field of Search ............... 160/118, 129, 126, 193, 160/331, 332, 344–347; 49/118, 121, 123, 264, 265, 332, 445, 404, 409

[56] References Cited

U.S. PATENT DOCUMENTS

| | | | |
|---|---|---|---|
| 1,299,074 | 4/1919 | Warman | 49/118 |
| 1,480,918 | 1/1924 | Szirmay | 49/264 X |
| 1,544,751 | 7/1925 | Haynes et al. | 49/263 X |
| 2,014,752 | 9/1935 | Vesey | 160/344 X |
| 2,634,124 | 4/1953 | Davis | 49/265 X |
| 3,196,511 | 7/1965 | Kintner | 160/330 X |
| 3,334,444 | 8/1967 | Hargrove | 49/404 |
| 3,358,403 | 12/1967 | Dinsmore | 49/445 |

*Primary Examiner*—Kenneth Downey
*Attorney, Agent, or Firm*—Weingarten, Schurgin & Gagnebin

[57] ABSTRACT

A door through which vehicles can pass and which is foldable and flexible and which is particularly suited for carwashes. The door is suspended from a track by rollers movable along the track, and is opened by actuating a pneumatic cylinder, and closed by means of a counterweight. The door preferably comprises two flaps which are sealed where they meet in the middle of the doorway by means of hook and loop strip release fasteners. A wand or other vehicle sensor may be provided for actuation of the pneumatic cylinder.

7 Claims, 4 Drawing Figures

a compressor, or any other convenient source.

CARWASH DOOR

FIELD OF THE INVENTION

The present invention relates generally to doors for vehicle passage, and more particularly to carwash doors adapted to be automatically opened and closed.

BACKGROUND OF THE INVENTION

In order for a carwash to function properly, particularly in colder climates, the water should be reasonably warm, and the interior of the carwash must be maintained at temperatures well above freezing. This requires that the water and the interior of the carwash be heated, particularly in the winter. In the past, a great deal of this heat has been lost through the doors of the carwash, requiring the consumption of a large amount of energy. With energy supplies becoming scarcer and more expensive, it is highly desirable to prevent as much of this heat loss as possible.

Many existing carwashes provide for no door whatsoever, and the loss of energy, especially in a cold climate, is considerable. Examples of such carwashes are shown in U.S. Pat. Nos. 3,822,430; 3,658,590; 3,315,691; 3,368,572; 3,451,094; and 3,587,807. U.S. Pat. No. 4,135,533 provides for an air curtain at the entrance and exit of a carwash, however such a curtain requires a large amount of energy to maintain, and is not particularly effective in preventing heat loss. U.S. Pat. No. 3,179,117 discloses a carwash having nonmovable flaps which only partially cover the entrance to the carwash, and which are also not well suited to the prevention of heat loss, while U.S. Pat. No. 3,162,883 provides only for a metal gate which allows for the passage of air therethrough. A standard overhead garage door is disclosed in U.S. Pat. No. 3,447,505, however the door does not appear to be automatically actuated and such a door requires a lengthy period of time to open and close, thus permitting the escape of a considerable amount of heat, and resulting in a low volume of traffic therethrough. Bearing these deficiencies in mind, the unique advantages of the present invention will become apparent.

SUMMARY OF THE INVENTION

An object of this invention is to provide a carwash door which is effective to prevent the escape of heat from within the carwash, and yet is able to permit a high volume of traffic through the carwash. Another object of the invention is to provide a carwash door which is automatically actuated. A further object of this invention is to provide a carwash door which is inexpensive and relatively easy to construct.

Broadly speaking, this invention concerns a carwash door and more specifically includes two flexible curtains suspended from rollers which ride on an overhead track. A pneumatic cylinder is provided for opening the door, while a counterweight is provided for closure thereof. A single cord or line is used in conjunction with a plurality of pulleys such that one piston stroke within the pneumatic cylinder provides four times the movement in the cord, and is sufficient to completely open the carwash door. Hook and loop strip release fasteners, such as Velcro tabs, may be used to secure the two flaps of the curtain together where they meet in the middle of the door. A wand or other vehicle sensor may be provided to automatically actuate the pneumatic cylinder to open the door and to vent the pneumatic cylinder to close the door. A window may be provided in the door to avoid accidents.

The carwash door of the present invention is dependable, highly responsive and is inexpensive to build and maintain. Once the wand is engaged by a car, the pneumatic cylinder is immediately actuated to open the door within seconds. Once the car has passed over the wand and it is returned to its normal position, the pneumatic cylinder is immediately vented, and the counterweight acts to close the door, again within seconds. As the two halves of the door meet in the middle thereof, the Velcro tabs grab each other to seal off the entrance. Thus, the door is opened for only a brief period of time as a car enters or exits from the carwash, and very little heat is lost. Also, very little energy is required to open and close the door.

DESCRIPTION OF THE DRAWING

The present invention can be more fully understood by the following detailed description and accompanying drawing, in which.

DETAILED DESCRIPTION OF THE INVENTION

Figure 1:
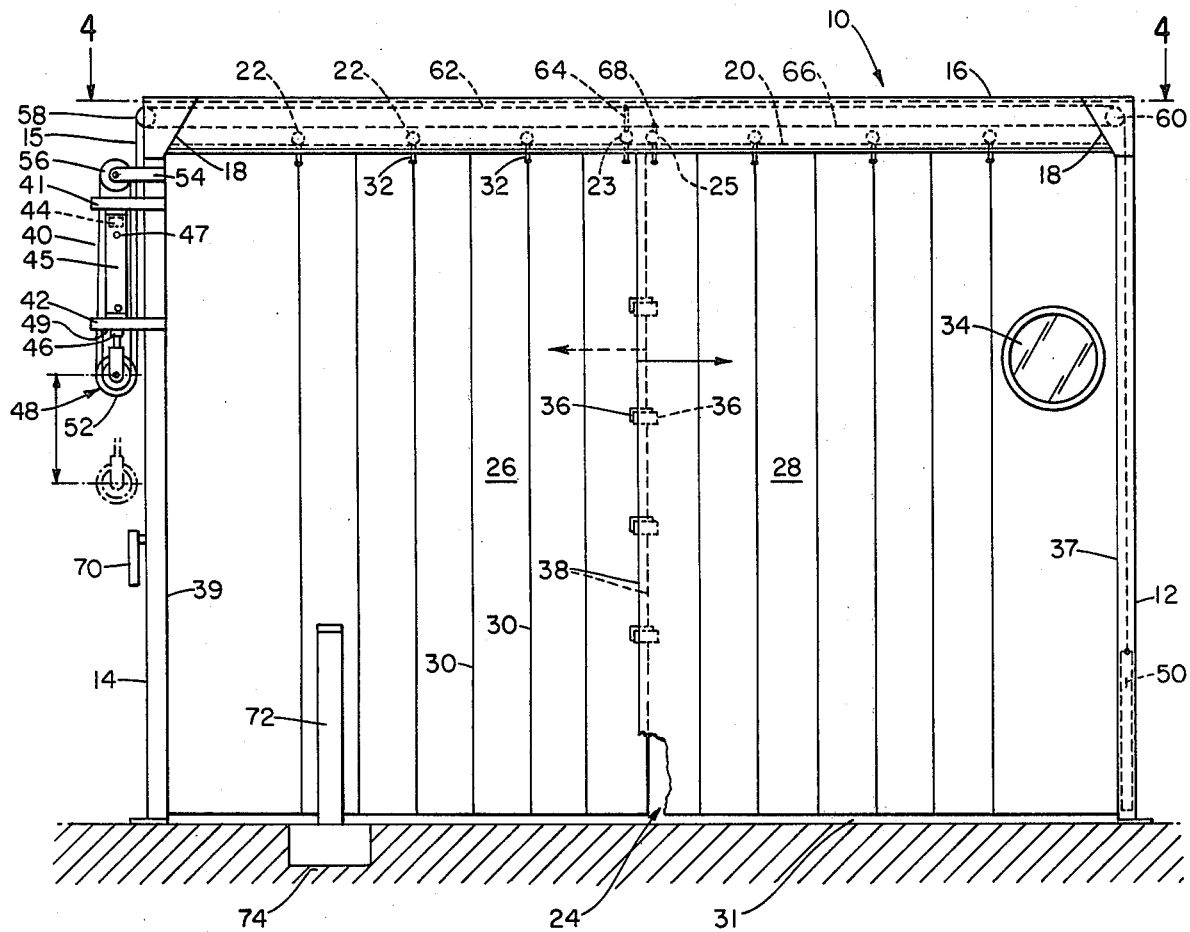
FIG. 1 is a front pictorial view of a preferred embodiment of the present invention showing the door in a closed position.

With reference now to FIGS. 1, 2, 3 and 4, the carwash door 10 includes a frame having vertical side supports 12 and 14 and a horizontal top support 16. Top support 16 is joined to side supports 12 and 14 by braces 18 or by any other conventional means. Disposed on the downwardly facing side of top support 16 is a track 20 upon which ride a plurality of rollers 22. Suspended from rollers 22 is a curtain 24 formed of two flaps 26 and 28, which are of approximately the same size. Curtain 24 is collapsible into folded sections along creases 30, and rollers 22 are attached to curtain 24 by gripping means 32, preferably at creases 30. Flap 26 is secured along its left edge 39 to side support 14, while flap 28 is secured along its right edge 37 to side support 12, as shown in FIG. 1. A window 34 may be provided in curtain 24 in either flap 26 or flap 28 in any desired location between creases 30 to prevent accidents. As shown in FIG. 1, window 34 is preferably located at the extreme right hand portion of flap 28 adjacent side support 12 so as not to interfere with the opening and closing of curtain 24. Curtain 24 typically hangs loosely along the ground. A plurality of cooperating hook and loop strip release fasteners 36 are provided along facing, overlapping edges 38 of flaps 26 and 28 so that edges 38 thereof are secured to one another when the curtain 24 is in a closed position, as shown in FIG. 1. Fasteners 36 preferably comprise Velcro tabs. It should be noted that other types of automatic latching means could be used in place of the Velcro tabs to seal overlapping edges 38.

Disposed on side support 14 is a pneumatic cylinder 40 which is held in place in a typically vertical position by support arms 41 and 42. Cylinder 40 is actuated by application of pneumatic pressure thereto to open curtain 24. The required pneumatic pressure may be supplied in any known manner, such as by an air pump, which is not shown. Cylinder 40 has an interior chamber 45 having a predetermined length, and chamber 45 has a piston 44 which rides therein. A piston arm 46 extends from piston 44 through an end of chamber 45, preferably the lower end, as shown in FIG. 1, and projects externally of cylinder 40. A vent 47 is provided in a cylinder 40 and communicates with chamber 45 to vent the chamber during deactuation of cylinder 40. Disposed in side support 12 and suspended therefrom is a counterweight 50. Counterweight 50 is adapted for closing curtain 24 when pneumatic cylinder 40 is vented through vent 47, and it is of sufficient weight to rapidly move curtain 24 along track 20. However, counterweight 50 is also sufficiently light so that it may be raised to an elevated position within support 12 when cylinder 40 is actuated.

Curtain 24 is connected to cylinder 40 and to counterweight 50 by a cord 15 such as a wire or a rope. Preferably, cylinder 40, counterweight 50 and curtain 24 are interconnected by a single, continuous cord 15. Disposed on the distal end of arm 46 is a pulley 48 having two wheels 52 rotatably mounted thereon. A single pulley wheel 56 is rotatably mounted on the end of an arm 54 extending outwardly from side support 14. A two-wheel pulley 58 is disposed within brace 18 where the top of side support 14 joins top support 16, and a two-wheel pulley 60 is also found within brace 18 where the top of side support 12 joins top support 16. One end of cord 15 is secured to a post 49 in lower support arm 42. Cord 15 then passes over one wheel of pulley 48, extends upwardly parallel to side support 14 and passes over wheel 56. Cord 15 passes downwardly and over the other wheel of pulley 48 and then extends upwardly again along side support 14 and passes over one wheel of pulley 58. Cord 15 extends parallel to track 20 within top support 16 from pulley 58 across an upper level 62 to pulley 60 to form line 61.

Cord 15 is attached to flap 26 at a point on upper level 62 on line 61 by clamp means 64 which extends from roller 23. Clamp means 64 is preferably secured to line 61 at about the center thereof when curtain 24 is in a closed position, as shown in FIG. 1. Cord 15 passes over one wheel of pulley 60, and extends back toward pulley 58 along a lower level 66 within top support 16 to form line 63. Flap 28 of curtain 24 is secured to cord 15 by clamp means 68 which extends from roller 25. Clamp means 68 is preferably secured to line 63 at about the center thereof when curtain 24 is in a closed position, as shown in FIG. 1. Once cord 15 passes over the second wheel of pulley 58, it extends parallel to track 20 along upper level 62 to the other wheel of pulley 60 to form line 65. Cord 15 then passes from pulley 60 downwardly through side support 12 and to counterweight 50 where an end thereof is secured to an upwardly facing portion of counterweight 50. This particular configuration permits edges 38 of each flap 26 or 28 of curtain 24 to be moved a distance along track 20 four times the length of the stroke of piston 44 within chamber 45. Thus, for a cylinder 40 having a stoke of a predetermined distance, each section 26 and 28 may have a width approximately four times the predetermined distance and the curtain 24 may be approximately eight times the width of the predetermined distance. Counterweight 50, on the other hand, must fall a distance equal to the length of travel of edges 38 of flaps 26 or 28 on track 20. In a preferred embodiment of the present invention, the width of each of flaps 26 and 28 is about four feet (1.22 m), while the length of chamber 45 is about twelve inches (30.48 cm).

It should be noted that cord 15 may be rigged in many other configurations with respect to cylinder 40, counterweight 50, and curtain 24, and that the above described embodiment is only a preferred one, and one that produces optimal results.

Figure 2:
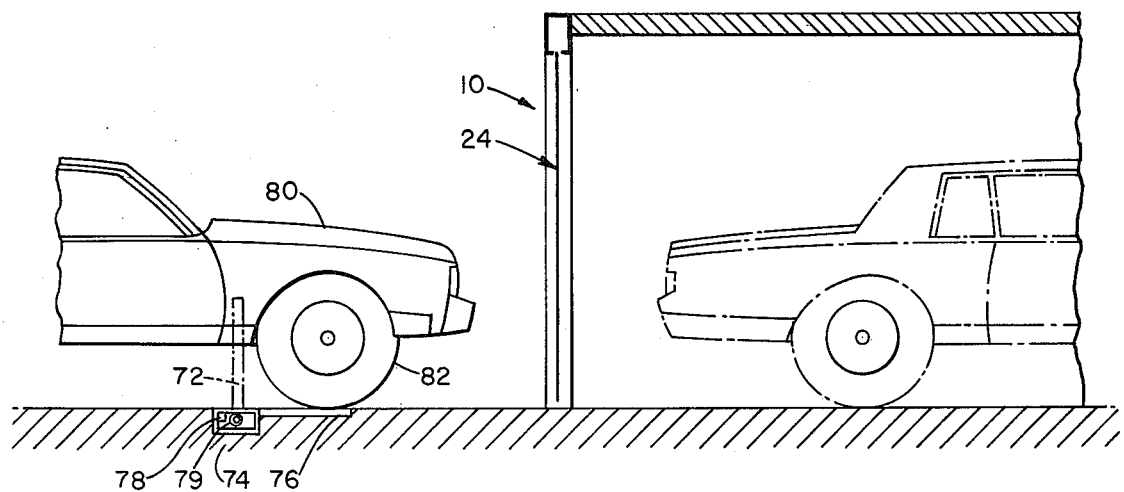
FIG. 2 is a side pictorial view of the embodiment of FIG. 1 showing a car passing through the door.

A manually actuated switch 70 disposed on side support 14 may be utilized to actuate cylinder 40 to open curtain 24 or to de-actuate cylinder 40 and to open vent 47 of chamber 45 to permit counterweight 50 to fall to close curtain 24. In addition, curtain 24 may be opened and closed automatically by means of a wand 72 or any other vehicle sensor which is positioned in front of curtain 24 a distance sufficient to allow a vehicle 80 to trigger it prior to entering door 10. Wand 72 is disposed adjacent the center of either flap 26 or flap 28, as shown in FIG. 1, where it may be engaged by the wheel 82 of an approaching vehicle 80, as shown in FIG. 2. Wand 72 is pivotably mounted in a well 74 where it is attached to cylinder actuating means 78. Wand 72 is biased into an upright position, as shown in FIG. 1, by biasing means 79 disposed in well 74. When wand 72 is in an upright position, vent 47 is open, and cylinder 40 is disconnected from a source of compressed air, so that counterweight 50 retains curtain 24 in a closed condition. When wand 72 is engaged by the wheel 82 of a vehicle 80, wand 72 is pivoted about well 74 into a horizontal position, as shown in FIG. 2, and is depressed downwardly into a cooperatively shaped well 76 in the ground adjacent well 74. When wand 72 is in a horizontal position, vent 47 is closed and cylinder actuating means 78 is triggered, and chamber 45 is connected to a source of compressed air to open curtain 24. As vehicle 80 passes through the open curtain 24, wand 72 is released by the wheels of vehicle 80, and returns to an upright position to close curtain 24.

Figure 3:
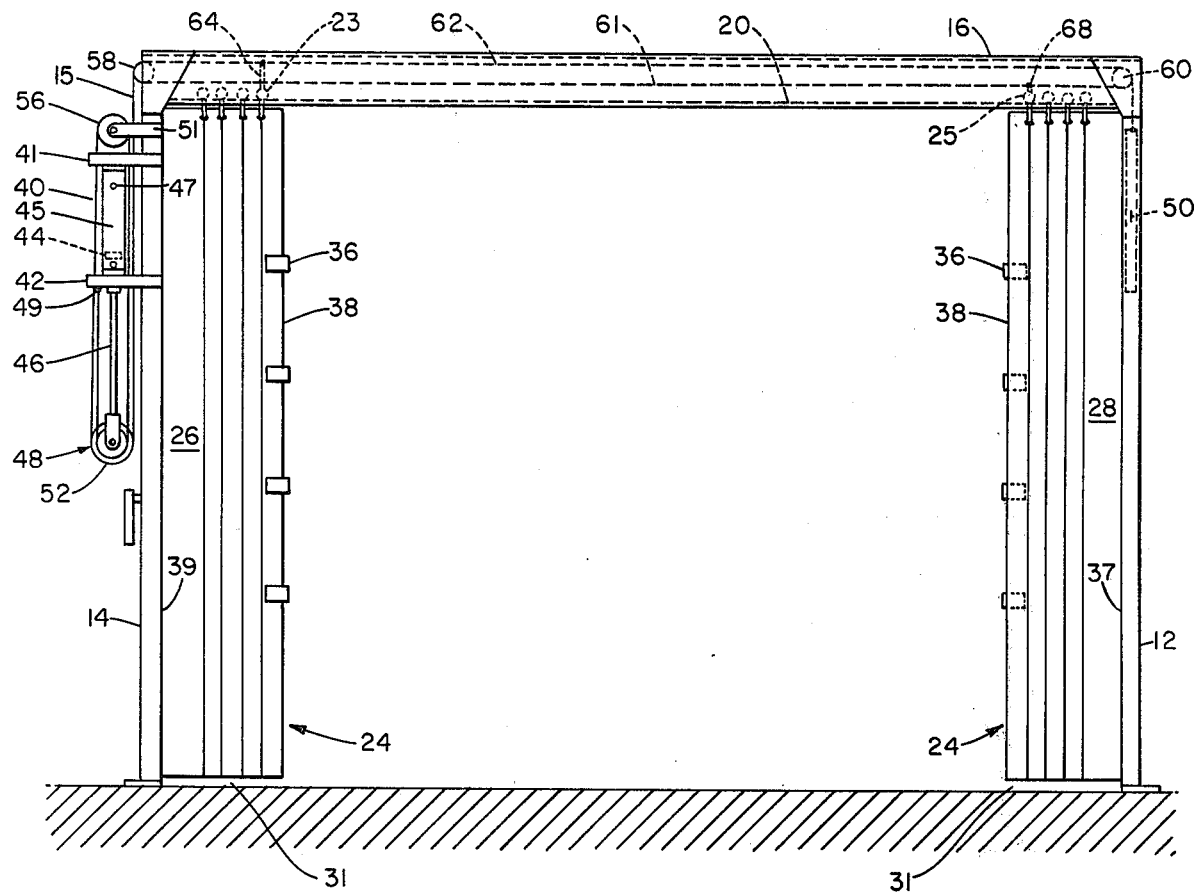
FIG. 3 is a front view of the embodiment of FIG. 1 showing the door in an open position.
Figure 4:
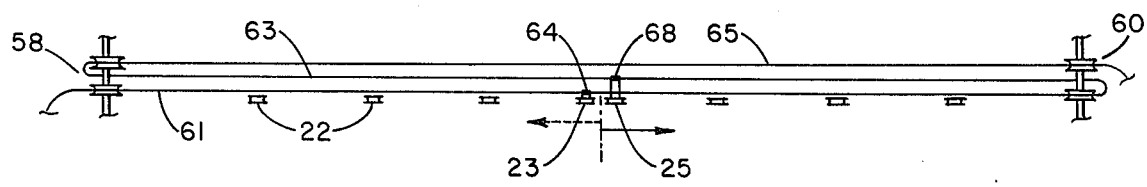
FIG. 4 is a top view of the embodiment of FIG. 1.

The operation of this invention will now be described with reference to FIGS. 1, 2, 3 and 4 thereof. Curtain 24 is in a normally closed position, as shown in FIG. 1, and wand 72 is in a normally upright position. Upon the approach of a vehicle 80, as shown in FIG. 2, wand 72 is engaged by a wheel 82 thereof and is pivoted about well 74 into well 76. Cylinder actuating means 78 is thereby actuated, causing vent 47 of chamber 45 to be closed and connecting chamber 45 to a source of compressed air. Piston 44, which in the normally closed position of curtain 24 resides in the upper end of chamber 45 adjacent arm 41, is driven downwardly as shown in FIG. 1, until it is in a lower end of chamber 45, adjacent support arm 42. At this point, piston arm 46 is fully extended downwardly from cylinder 40 the length of chamber 45. Cord 15 is pulled downwardly toward cylinder 40 over pulley 58 and line 61 moves to the left, line 63 moves to the right, and line 65 moves to the left, as shown in FIG. 4. Lines 61, 62 and 63 each travel a distance four times the length of chamber 45. Roller 23, which is attached to line 61 is pulled to the left, as shown in FIG. 3, a distance four times the length of chamber 45. Roller 25 which is attached to line 63 is pulled to the right, as shown in FIG. 3, a distance four times the length of chamber 45. Simultaneously therewith, counterweight 50, which is positioned at the bottom of side support 12 in the normally closed position of curtain 24 shown in FIG. 1, is raised within side support 12 a distance four times the length of chamber 45, until it is in the position shown in FIG. 3. While the above is occurring, the cooperating portions of each fastener 36 on edges 38 are easily pulled apart. Edges 38 are drawn away from each other, flap 26 moving to the left and flap 28 moving to the right in FIG. 3. Flaps 26 and 28 fold together along creases 30. The curtain 24 now in its fully open position, as shown in FIG. 3, and the vehicle 80 may pass therethrough, as shown in FIG. 2. It should be noted, that the above sequence of events happens in a rapid manner, so that preferably a vehicle 80 approaching curtain 24 in its normally closed position and depressing wand 72 into well 76 may continue to advance towards curtain 24 without stopping and pass through door 10 after curtain 24 has opened. The desired spacing of wand 72 from door 10 is determined by the speed of opening of curtain 24 and by the desired speed of approach of vehicle 80. If wand 72 were closer than this desired spacing, curtain 24 would still function as previously described, but automobile 80 will be required to stop for a moment prior to passing through door 10. In the preferred embodiment, wand 72 is at least two feet (60.96 cm) feet from door 10.

Once automobile 80 has passed through door 10, biasing means 79 within well 74 returns wand 72 to an upright position, as shown in FIG. 1, thus deactuating cylinder actuating means 78, opening vent 47 of chamber 45 and disconnecting chamber 45 from a source of compressed air. Counterweight 50 then is permitted to fall downwardly within side support 12, under the influence of gravity, from the position shown in FIG. 3 to the position shown in FIG. 1. This distance of fall is four times the length of chamber 45. As counterweight 50 falls, line 61 moves to the right, line 63 moves to the left and line 65 moves to the right, as shown in FIG. 4. Roller 25 is drawn to the left from its position in FIG. 3 to its position in FIG. 1, and roller 23 is also drawn to the right from its position in FIG. 3 to its position in FIG. 1. As this occurs, edges 38 and fasteners 36 of flaps 26 and 28 meet. The cooperating portions of each fastener 36 are mounted at the same height along edges 38 on flaps 26 and 28 so that as the cooperating portions of each fastener 36 meet, they automatically grab one another to seal edges 38 of flaps 26 and 28. The curtain is thus closed, and the entrance to door 10 is completely sealed, preventing the loss of heat from within. The bottom portion of flaps 26 and 28 remain unsealed, but because edges 37, 38 and 39 thereof are sealed, lower edges 31 are held in place close to the ground, and very little heat is allowed to escape.

It should be noted, that although preferred dimensions have been provided, sections 26 and 28 and thus curtain 24 may be of any convenient size, as required by the needs of an individual carwash. Furthermore, curtain 24 may be composed of any flexible material which is relatively impermeable to air, and which is not affected by water, such as a rubberized material or a plastic. Cord 15 may be composed of a standard rope of one eighth inch (0.32 cm) diameter or of a wire cable or of any other convenient and commonly known material. Window 34 is preferably formed of a clear plastic material, while side support 12 and 14 and top supports 16 are preferably formed of a metal or other rigid material. Wand 72 may be formed of any relatively rigid but durable material.

It will be appreciated that this invention may be utilized either as the entrance door to a carwash or the exit door to a carwash or as a door separating various stages of a carwash. Such a door may also be used in any other industrial application for vehicles where it is desired to be able to open and close a door readily upon command to allow vehicles to pass therethrough and yet prevent the loss of heat or moisture from within a particular building or enclosure.

The present invention is not to be limited in scope nor restricted in form except by the claims appended hereto.

What is claimed is:

1. A door for the passage of vehicles comprising:
   two side supports and a top support defining a doorway;
   a generally flexible curtain suspended from said top support, said curtain being formed of two sections and extending across the width of said doorway when in a closed position, each of said sections having a fixed edge adjacent an associated one of said side supports and a free edge, said free edge of each of said sections being disposed in a position intermediate said side supports and adjacent the free edge of the other of said sections when said curtain is in a closed position said free edge of each of said sections being disposed adjacent its fixed edge and in spaced relation with the free edge of the other of said sections when said curtain is in an open position;
   means actuable for withdrawing said sections of said curtain into said open position to permit a vehicle to pass through said doorway, said withdrawing means comprising:
      a pneumatically actuated cylinder having a piston movable within a chamber and a piston rod attached to said piston, said piston rod having a distal end projecting externally of said chamber;
      a first pulley disposed at said distal end of said piston rod;
      a second pulley disposed at the intersection of one of said side supports and said top support;
      a third pulley disposed at the intersection of the other of said side supports and said top support;
      a fourth pulley disposed adjacent said pneumatically actuated cylinder; and
      pulley lines interconnecting said first pulley, said second pulley, said third pulley and said fourth pulley;
   means for drawing said sections of said curtain into said closed position upon deactuation of said withdrawing means, said drawing means being interconnected with said first pulley, said second pulley, said third pulley and said fourth pulley by said pulley lines; and
   means for actuating and deactuating said withdrawing means.

2. The door of claim 1 wherein said pulley lines comprise a single line anchored at one end thereof adjacent said pneumatic cylinder and secured at the other end thereof to said drawing means.

3. The door of claim 2 wherein said first pulley, said second pulley and said third pulley each contain two pulley wheels.

4. The door of claim 2 wherein each of said free edges is secured at a point intermediate said second pulley and said third pulley to a portion of said single line.

5. The door of claim 4 wherein said free edge of each of said sections travels a distance along said top support four times the distance traveled by said piston within said chamber upon actuation or deactuation of said pneumatically actuated cylinder.

6. The door of claim 4 or 5 wherein said drawing means comprises a counterweight, and wherein said pneumatically actuated cylinder is disposed on one of said side supports and said counterweight is disposed within the other of said side supports and travels vertically therein.

7. A door for the passage of vehicles, comprising:
a first side support, a second side support and a top support defining a doorway;
a track disposed on said top support;
a generally flexible curtain suspended from said track, said curtain being formed of two flaps which extend across the width of said doorway when said curtain is in a closed position, each of said flaps having a fixed edge adjacent an associated one of said first and second side supports and a free edge, said free edge of each of said flaps being disposed in a position intermediate said first side support and said second side support adjacent the free edge of the other of said flaps when said curtain is in a closed position, said free edge of each of said flaps being disposed adjacent its fixed edge and in spaced relation with the free edge of the other of said flaps when said curtain is in an open position;
a pneumatic cylinder disposed on said first side support and being actuable for withdrawing said flaps into said open position to permit a vehicle to pass through said doorway, said pneumatic cylinder having a piston moveable within a piston chamber and a piston rod attached to said piston, said piston rod having a distal end projecting externally of said chamber;
a plurality of pulleys, comprising:
 a first pulley disposed on said distal end of said piston rod;
 a second pulley disposed at the intersection of said top support and said first side support;
 a third pulley disposed at the intersection of said top support and said second side support;
 a fourth pulley disposed above said pneumatic cylinder on said first side support;
a single line anchored at one end to said first side support adjacent said pneumatic cylinder and interconnecting the wheels of each of said first, second, third and fourth pulleys, said line being secured to said free edge of each of said flaps at a point intermediate said second and said third pulleys;
a counterweight secured to the other end of said line and being suspended by said line within said second side support from said third pulley, said counterweight being raised vertically within said second side support upon actuation of said pneumatic cylinder and falling under the influence of gravity upon deactuation of said pneumatic cylinder to draw said curtain into said closed position;
means for venting said pneumatic cylinder upon deactuation thereof;
vehicle sensor means for actuating said pneumatic cylinder by coupling said piston chamber to a source of pressurized air upon approach of a vehicle and for deactuating said pneumatic cylinder by decoupling said chamber from said source of pressurized air and by coupling said piston chamber to said venting means when said vehicle has passed through said doorway; and
hook and loop strip release fasteners having cooperating portions disposed along confronting, overlapping portions of each of said free edges and being operable to automatically secure said free edges together when said door is in a closed position, said hook and loop strip release fasteners being readily pulled apart when said door is moved from a closed position to an open position.

* * * * *